UNITED STATES PATENT OFFICE.

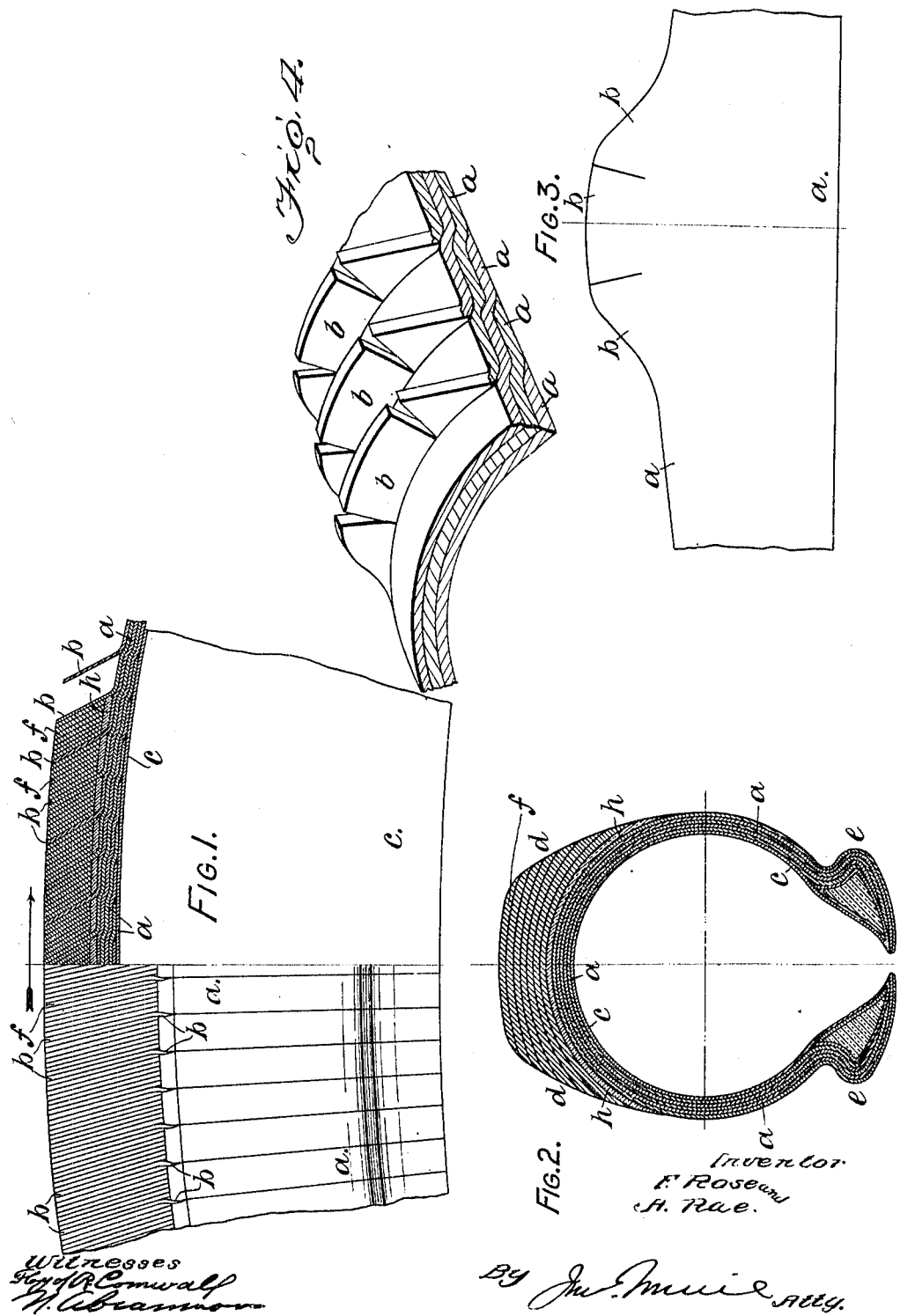

FREDERICK ROSE, OF LIVERPOOL, AND ANDREW RAE, OF SEACOMBE, ENGLAND.

TIRE FOR VEHICLE-WHEELS.

1,105,459.  Specification of Letters Patent.  Patented July 28, 1914.

Application filed June 9, 1911. Serial No. 632,192.

*To all whom it may concern:*

Be it known that we, FREDERICK ROSE and ANDREW RAE, subjects of the King of England, residing, respectively, at Liverpool, in the county of Lancaster, England, and Seacombe, in the county of Cheshire, England, have invented certain new and useful Improvements in or Connected with the Tires of Vehicle-Wheels, of which the following is a specification.

This invention has reference to tires of vehicle wheels and the like, and more particularly to pneumatic tires or covers of such tires, and to that kind wherein the "foundation" or portion, which gives strength and form to the cover, and takes, and has to resist the strains and stresses to which it is subjected, is composed of or comprises in its structure canvas or other like fabric transversely arranged overlapping strips adhered together by india rubber or other adhesive.

The chief object of the present invention is to provide improvements, hereinafter described, in connection with the tire covers or tires, of the kind above referred to, that is to say, the "foundation" of them, by which they are stronger and capable of resisting the wear and tear to which they are subjected better than those hitherto proposed, and generally rendered practical, and serviceable, which hitherto they have not been. In the following description, which is made in connection with the accompanying drawings, an outer casing or cover for a pneumatic tire, and the manner of constructing it; according to this invention, is described.

In the drawings, Figure 1 is a side elevation, partly an outside view, and partly in section, of the tire cover; and Fig. 2 is a cross section of same. Fig. 3 is a plan of one strip of canvas or like material, used in the construction of the cover. Fig. 4 is a detail perspective section of the layers of canvas which form a part of the tread and the foundation of the latter.

Referring now to the drawings, $a$ represents the overlapping strips or bands of canvas or like material; and in the construction shown in the drawings, there is employed one continuous lamina $c$ of canvas or other suitable fabric (or a plurality of laminæ may be used), arranged so as to form the base matrix of the tire cover, and extend continuously all around the tire; and this has on its edges the beaded or enlarged part $e$, to which, as stated, the ends or edges of the strips $a$ reach, and which are united with such edges.

Upon and over the base or matrix $c$ of the tire—which will be of the form required, both circumferentially and transversely—the transverse strips or bands $a$ of textile fabric are laid; and these are arranged in such a manner, that between the points where one strip $a$ commences on the inside of this foundation, next the matrix lamina $e$, and from this at the outside, viewing the tire in a circumferential direction, there are provided a plurality of inner edges of other overlapping strips $a$, so that at every part of the foundation in its thickness in a radial direction, there will be three or more laminæ of the fabric. The parts $a$ thus constitute a foundation throughout the tire of multi-stepped bands, in which these several—three or more—steps in the thickness are all adhered or cemented together in any known suitable way.

With regard to the holding together of the strips or bands $a$ by adhesive, this may be conveniently done by providing them with "frictioning" on each—or one—side. When laid and cemented together on one another, in the manner shown in the drawings, the strips or bands $a$ appear, as stated, as a series of "scales," overlapping one another, but together constituting a continuous and strong structure of textile fabric.

The width of each of the strips or bands $a$ circumferentially will, in most cases, be from one to four inches, according to the size of the tire or other requirement, and they may diminish somewhat in width from the outer or central portion which comes on the outside of the cover, toward the edges or ends.

In the case shown in Figs. 1 and 2 of the drawings, the tire is shown provided with a raised or projecting tread portion $d$; and this is composed mainly of a number of blocks of laminæ $f$ of canvas or other suitable fabric, adhered together in any known way and so arranged as to act edgewise on the surface of the road; the planes in which they lie being transverse planes, obliquely disposed relatively to the radial planes of the tire.

In the construction shown in Figs. 1 and 3, the strips or bands $a$, which constitute this body of the cover, have at the center portion of their length a projecting part $b$ at the edge or part where they come to the surface of the body; and these parts *b* are carried up, in the tire, as shown, and between them lie the blocks of laminæ *f*, to which they are caused to adhere by a suitable cementing medium. In this construction (Fig. 1) the blocks of the laminæ *f* of canves or the like, are therefore anchored down, as it were, to the body of the tire, through the relatively large number of interspaced outwardly projecting portions *b* of the bands or strips *a*, and constitute a bonded formation, furnishing a unified structure of treaded tire cover.

Between the tread parts *f*, and the body portion of the cover, strips of rubber *h*, are preferably introduced, to which they are cemented; while each strip itself is cemented to the body of the cover. These strips *h*, serve as a cushion or buffer between the tread blocks and the main body.

When the tire is built up as described, the whole is vulcanized under pressure.

The upwardly projecting portion *b* of the strips *a*, may be split at parts marked in black lines in Fig. 3, to enable them better to be bent to the outwardly projecting direction in relation to the other part.

In the case shown in the drawings, the body of the cover has combined with it, the matrix lamina (or laminæ) *c;* but in some cases, if desired, this need not be used.

With regard to the bands or strips *a*, these are, in most cases, not cut on the bias as regards their warp and weft, but on the straight; but if relatively large flexibility is required in the cover, the "scales", that is, the strips or bands *a*, themselves, can be arranged obliquely across the tire or cover to the general central plane instead of being at right angles thereto, as shown in the drawings. That is, these scales in appearance would lie across the tire or cover in an oblique manner, instead of a straight transverse manner. While these are the preferable manners of forming and arranging the strips or bands *a*, the warps and wefts of the textile fabric, if desired, may be disposed obliquely to the cover; that is, the fabric may be cut on the bias.

With regard to the tread portion described, this may be the form shown, namely of "raised" form; or it may be carried around farther on each side and merged gradually into the sides of the tire or cover.

The inclination of the laminæ *f* and *b*, or *f*, as the case may be, should always be in relation to the direction of the revolution of the tire, indicated by the arrow in Fig. 1, as shown.

What is claimed is:—

1. A wheel tire comprising a series of stepped plies of fabric extending continuously in one direction and inclination from the inner surface of the stepped plies to the outer surface thereof, each of the stepped plies having a part extending in one piece therewith in an outward direction from said outer surface at an angle oblique to the radius of the tire; and blocks of laminated fabric, the laminated members of which are at the same oblique inclination as the inclination of the parts extending outwardly from the said outer surface; substantially as set forth.

2. A wheel tire comprising a series of stepped plies of fabric extending continuously in one direction and inclination from the inner surface of the stepped plies to the outer surface thereof, each of the stepped plies having a part extending in one piece therewith which is slitted inwardly from the outer edge so as to constitute three pieces which extend in an outward direction from said outer surface at an angle oblique to the radius of the tire; and blocks of laminated fabric, the laminated members of which are at the same oblique inclination as the inclination of the parts extending outwardly from the said outer surfaces; the outer surfaces of the laminated members and the outer edges of the plies forming the tread of the tire, substantially as set forth.

In testimony whereof we have signed our names to this specification in the presence of two subscribing witnesses.

FREDERICK ROSE.
ANDREW RAE.

Witnesses:
  Somerville Goodall,
  Joseph W. Hunter.